United States Patent
Hansen (10) Patent No.: US 11,822,509 B2
(45) Date of Patent: Nov. 21, 2023

(54) HARDWARE-ASSISTED TRACKING OF REMOTE DIRECT MEMORY ACCESS (RDMA) WRITES TO VIRTUAL MACHINE MEMORY

(71) Applicant: VMware, Inc., Palo Alto, CA (US)

(72) Inventor: Jørgen Sværke Hansen, Allerød (DK)

(73) Assignee: VMware, Inc., Palo Alto, CA (US)

( * ) Notice: Subject to any disclaimer, the term of this patent is extended or adjusted under 35 U.S.C. 154(b) by 13 days.

(21) Appl. No.: 17/687,408

(22) Filed: Mar. 4, 2022

(65) Prior Publication Data

US 2023/0281153 A1 Sep. 7, 2023

(51) Int. Cl.
| | |
|---|---|
| G06F 9/455 | (2018.01) |
| G06F 15/173 | (2006.01) |
| G06F 15/167 | (2006.01) |
| G06F 12/0891 | (2016.01) |

(52) U.S. Cl.
CPC .... *G06F 15/17331* (2013.01); *G06F 9/45558* (2013.01); *G06F 12/0891* (2013.01); *G06F 15/167* (2013.01); *G06F 2009/45583* (2013.01); *G06F 2009/45591* (2013.01); *G06F 2009/45595* (2013.01)

(58) Field of Classification Search
CPC ............. G06F 9/45553; G06F 9/45558; G06F 2009/45583; G06F 2009/45591; G06F 2009/45595
See application file for complete search history.

(56) References Cited

U.S. PATENT DOCUMENTS

| | | | |
|---|---|---|---|
| 9,529,628 B2 * | 12/2016 | Vu | G06F 9/4484 |
| 2015/0268978 A1 * | 9/2015 | Vu | G06F 9/545 |
| | | | 718/1 |
| 2017/0371835 A1 * | 12/2017 | Ranadive | G06F 9/544 |
| 2021/0042139 A1 * | 2/2021 | Mansur | G06F 9/45558 |
| 2023/0195533 A1 * | 6/2023 | Baskakov | G06F 9/5016 |
| | | | 718/105 |

* cited by examiner

Primary Examiner — Kostas J Katsikis (57) ABSTRACT

Techniques for live migrating a paravirtual remote direct memory access (PVRDMA) virtual machine (VM) from a source host system to a destination host system are provided. In one set of embodiments, during a pre-copy phase of the live migration process, a source hypervisor of the source host system can invoke an application programming interface (API) exposed by a source host channel adapter (HCA) of the source host system for initiating write tracing of remote direct memory access (RDMA) writes/atomic operations received from remote endpoints and can retrieve a write trace element generated by the source HCA that identifies a memory region of the PVRDMA VM written to as a result of an RDMA write/atomic operation and a write location within the memory region. The source hypervisor can then identify one or more guest memory pages of the PVRDMA VM dirtied per the write trace element and transmit data contents of those pages to the destination host system.

21 Claims, 6 Drawing Sheets

HARDWARE-ASSISTED TRACKING OF REMOTE DIRECT MEMORY ACCESS (RDMA) WRITES TO VIRTUAL MACHINE MEMORY

CROSS-REFERENCES TO RELATED APPLICATIONS

The present application is related to U.S. patent application Ser. No. 17/687,414, entitled "Live Migration of Paravirtual Remote Direct Memory Access (PVRDMA) Virtual Machines via Hardware-Assisted Queue Pair Suspend/Resume and Query/Recreate Operations" and filed concurrently herewith. The entire contents of this related application are incorporated herein by reference for all purposes.

BACKGROUND

Unless otherwise indicated, the subject matter described in this section is not prior art to the claims of the present application and is not admitted as being prior art by inclusion in this section.

Remote Direct Memory Access (RDMA) is a technology that enables networked computer systems/devices, referred to herein as endpoints, to transfer data between their main memories without intervention by the endpoints' central processing units (CPUs) or operating systems/hypervisors. This allows for low latency and high throughput networking, which is desirable in performance-oriented environments such as data centers, supercomputing clusters, and the like.

RDMA communication between two bare-metal (i.e., non-virtualized) endpoints is achieved using physical RDMA-capable network interface cards, known as host channel adapters (HCAs), that are installed at the endpoints. These HCAs include hardware for directly reading and writing main memory allocated to RDMA-aware applications and for processing RDMA operations, known as work requests, that are submitted by the applications via a set of RDMA application programming interfaces (APIs). For example, consider a scenario in which an RDMA-aware application A1 running on a first bare-metal endpoint E1 wishes to use RDMA to remotely write data into the memory of another RDMA-aware application A2 running on a second bare-metal endpoint E2. In this scenario, applications A1 and A2 can invoke RDMA APIs that instruct the HCAs on endpoints E1 and E2 respectively to create, in HCA hardware, RDMA resources for establishing RDMA communication between the endpoints and for carrying out the write. These RDMA resources can include, among other things, a queue pair of work queues (i.e., a send queue and a receive queue) at each HCA that are used to enqueue and process work requests submitted by applications A1 and A2, one or more completion queues at each HCA that are used to track completed work requests, a memory region R1 at the HCA of endpoint E1 that identifies a virtual memory address range of application A1 registered for access by E1's HCA, and a memory region R2 at the HCA of endpoint E2 that identifies a virtual memory address range of application A2 registered for access by E2's HCA.

Once the RDMA resources have been created, application A1 on endpoint E1 can invoke an RDMA API for submitting an RDMA write work request destined for endpoint E2, where the API call specifies a local memory buffer at E1 that holds the write data (e.g., within memory region R1) and its target write location at E2 (e.g., within memory region R2). In response, endpoint E1's HCA can receive the API call, enqueue (i.e., post) a work request element (WQE) encapsulating the work request into the send queue of its queue pair, and execute the posted WQE by transmitting, via an RDMA network protocol, a message including the write data and its target write location to endpoint E2's HCA. Upon receiving this message, endpoint E2's HCA can directly write the data included therein at the specified write location in memory region R2 without involving E2's CPU or operating system/hypervisor kernel and can return an acknowledgement to E1's HCA. Finally, E1's HCA can receive the acknowledgement and move the WQE from the send queue to an associated completion queue, thereby signaling completion of the RDMA write to application A1.

Paravirtual RDMA (PVRDMA), also known as virtual RDMA or vRDMA, is a technology that enables a virtualized endpoint (i.e., virtual machine (VM)) to carry out RDMA communication with other VMs and/or with bare-metal endpoints, thus extending the performance benefits of RDMA to virtualized deployments. Such a VM is referred to herein as a PVRDMA VM. PVRDMA typically involves implementing a software-based PVRDMA device at the hypervisor level that emulates a physical host HCA and exposing the PVRDMA device for use by the PVRDMA VM. RDMA-aware guest applications running within the PVRDMA VM can interact with the PVRDMA device by invoking the RDMA APIs mentioned above for creating RDMA resources (e.g., queue pairs, completion queues, memory regions, etc.), submitting work requests, and so on. The PVRDMA device can pass the APIs calls to the host HCA, which can process them in hardware per its conventional HCA functionality (e.g., create RDMA resources, post and execute WQEs, etc.). The PVRDMA device can also create, in software, "shadow" copies of the RDMA resources created by the host HCA and map the shadow copies to the actual (i.e., physical) RDMA resources residing in HCA hardware, which allows the PVRDMA device to track the lifecycles of those physical RDMA resources.

Notably, in the course of executing WQEs, the host HCA will generate internal runtime state for certain types of queue pairs (specifically, reliable connected (RC) queue pairs which guarantee reliability of transmitted messages) that is not visible to the hypervisor/PVRDMA device. In addition, if the host HCA receives a message for an RDMA write (or an RDMA atomic operation that includes a write) from a remote endpoint that is directed to a memory region of the PVRDMA VM, the host HCA will directly execute the write against that memory region without intervention by the hypervisor/PVRDMA device. These aspects make it difficult to live migrate a PVRDMA VM—or in other words, move the VM from a source host system to a destination host system while the VM remains operational—because the hypervisor of the source host system cannot independently (1) capture the internal runtime state of all queue pairs in the source host system's HCA for propagation to the destination host system, and (2) track RDMA writes to the PVRDMA VM's memory regions that are submitted by remote endpoints during the live migration process. There are certain workarounds for (1) and (2) that can be used if all of the remote endpoints of the PVRDMA VM are also VMs, but these workarounds are ineffective if at least one remote endpoint is a bare-metal endpoint.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

1. Overview

Embodiments of the present disclosure are directed to techniques for enabling the live migration of PVRDMA VMs. A PVRDMA VM is a VM that uses a virtual/emulated HCA, referred to herein as a PVRDMA device, for RDMA communication with other (i.e., remote) endpoints.

According to a first set of embodiments, during a pre-copy phase of live migrating a PVRDMA VM from a source host system comprising a source hypervisor and source HCA to a destination host system comprising a destination hypervisor and destination HCA, the source HCA can track, in its hardware, portions of the PVRDMA VM's guest memory that it modifies (i.e., dirties) in response to RDMA writes or RDMA atomic operations originating from remote endpoints and can generate write traces composed of write trace elements identifying the dirtied portions. Each write trace element can include an identifier of a guest memory address range (i.e., memory region) being written to, the starting offset of the write, and the length of the write data. The source hypervisor can then retrieve the write traces, parse their contents, and transmit the data of the dirtied memory portions identified therein to the destination host system. Because the PVRDMA VM's memory regions can be destroyed (i.e., deregistered/invalidated) while these steps take place, in certain embodiments the source hypervisor can implement an algorithm that ensures all pending write traces directed to a destroyed memory region are processed before that memory region's identifier is reused by a new memory region, thereby avoiding scenarios in which incorrect data is inadvertently sent to the destination host system.

According to a second set of embodiments, during a switchover phase of the live migration of the PVRDMA VM, the source hypervisor can invoke APIs implemented in hardware by the source HCA for (1) suspending the operation of each queue pair of the PVRDMA VM present on the source HCA, and (2) querying the complete state of each suspended queue pair, including its internal runtime state (if any). For an RC queue pair, this internal runtime state can include information pertaining to in-flight WQEs of the queue pair that are not visible to the PVRDMA VM's PVRDMA device (i.e., source PVRDMA device), such as packet sequence numbers of the currently executing WQE in the send/receive queue, packet sequence numbers of an incoming RDMA write, and so on. The source hypervisor can then transmit the queried queue pair states, along with a virtual device state of the source PVRDMA device that encapsulates other RDMA resources associated with the queue pairs, to the destination host system.

Upon receiving this information, the destination hypervisor can invoke APIs implemented in hardware by the destination HCA for (3) recreating the complete state of each suspended queue pair, including its internal runtime state, on the destination HCA using the queried queue pair states, and (4) resuming operation of the suspended queue pairs there. Step (3) can be performed in conjunction with recreating other non-queue pair RDMA resources on the destination HCA, such as memory regions and completion queues, from the received virtual device state of the source PVRDMA device. Once the queue pairs are resumed, the migrated PVRDMA VM can be restarted and the live migration process can end.

2. Example Environment and High-Level Solution Design

Figure 1:
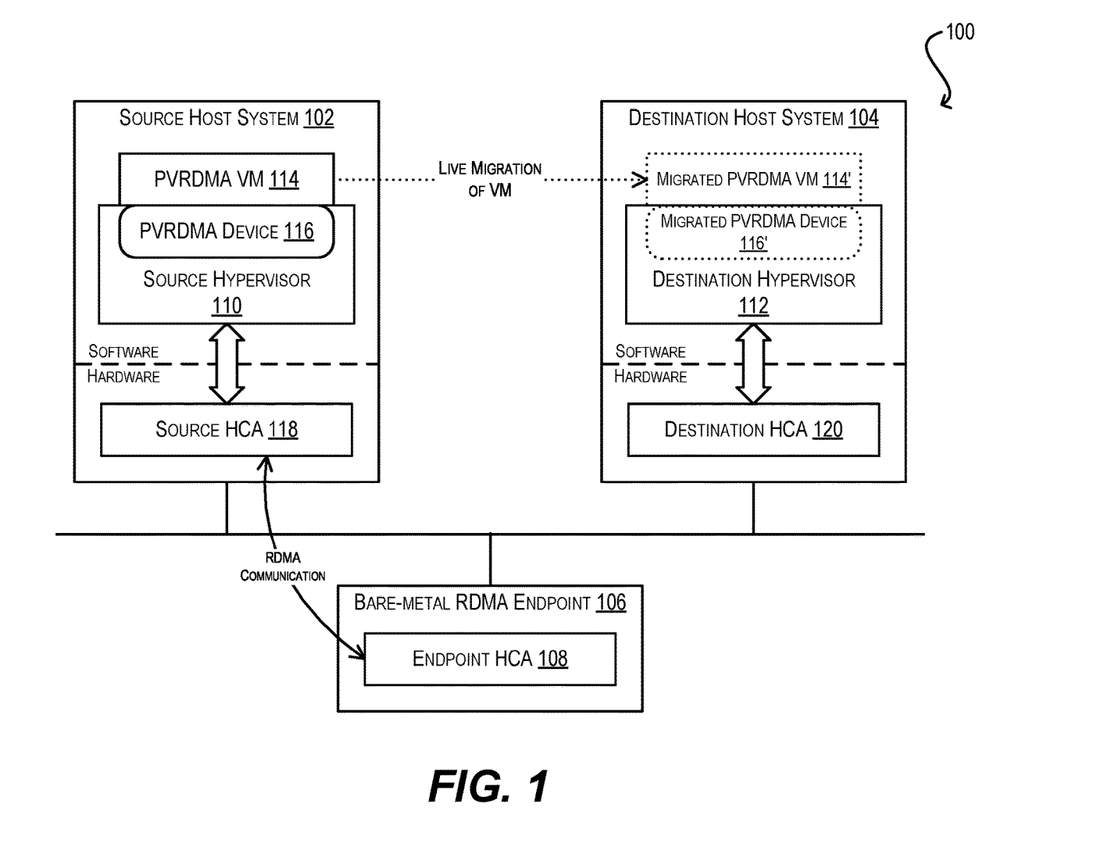
FIG. 1 depicts an example environment comprising a source host system running a PVRDMA VM, a destination host system, and a bare-metal RDMA endpoint.

FIG. 1 depicts an example environment 100 in which embodiments of the present disclosure may be implemented. As shown, environment 100 includes a first (i.e., source) host system 102 that is communicatively coupled with a second (i.e., destination) host system 104 and with a bare-metal RDMA endpoint 106 (hereinafter referred to as simply a "bare-metal endpoint"). Bare-metal endpoint 106 is any type of computer system or device that is capable of RDMA communication via an endpoint HCA 108 and is non-virtualized (i.e., not under the control of a hypervisor). For example, in one set of embodiments bare-metal endpoint 106 may be an RDMA-capable storage array or storage server.

Each host system 102/104 includes, in software, a hypervisor 110/112 (i.e., source hypervisor 110 and destination hypervisor 112 respectively) that provides an execution environment for running one or more VMs. In addition, source host system 102 includes a PVRDMA VM 114 that is configured to communicate via RDMA with bare-metal endpoint 106 using a PVRDMA device 116 implemented within source hypervisor 110. PVRDMA device 116, which is a virtual (i.e., emulated) HCA, enables this communication by receiving RDMA API calls made by RDMA-aware guest applications running in PVRDMA VM 114 and passing the API calls to a physical HCA of source host system 102 (i.e., source HCA 118), resulting in the creation of physical RDMA resources in the hardware of source HCA 118 and the exchange of RDMA messages between source HCA 118 and endpoint HCA 108 of bare-metal endpoint 106. PVRDMA VM 116 also maintains a virtual device state that includes shadow copies of the physical RDMA resources present on source HCA 118 for emulation purposes.

Figure 2:
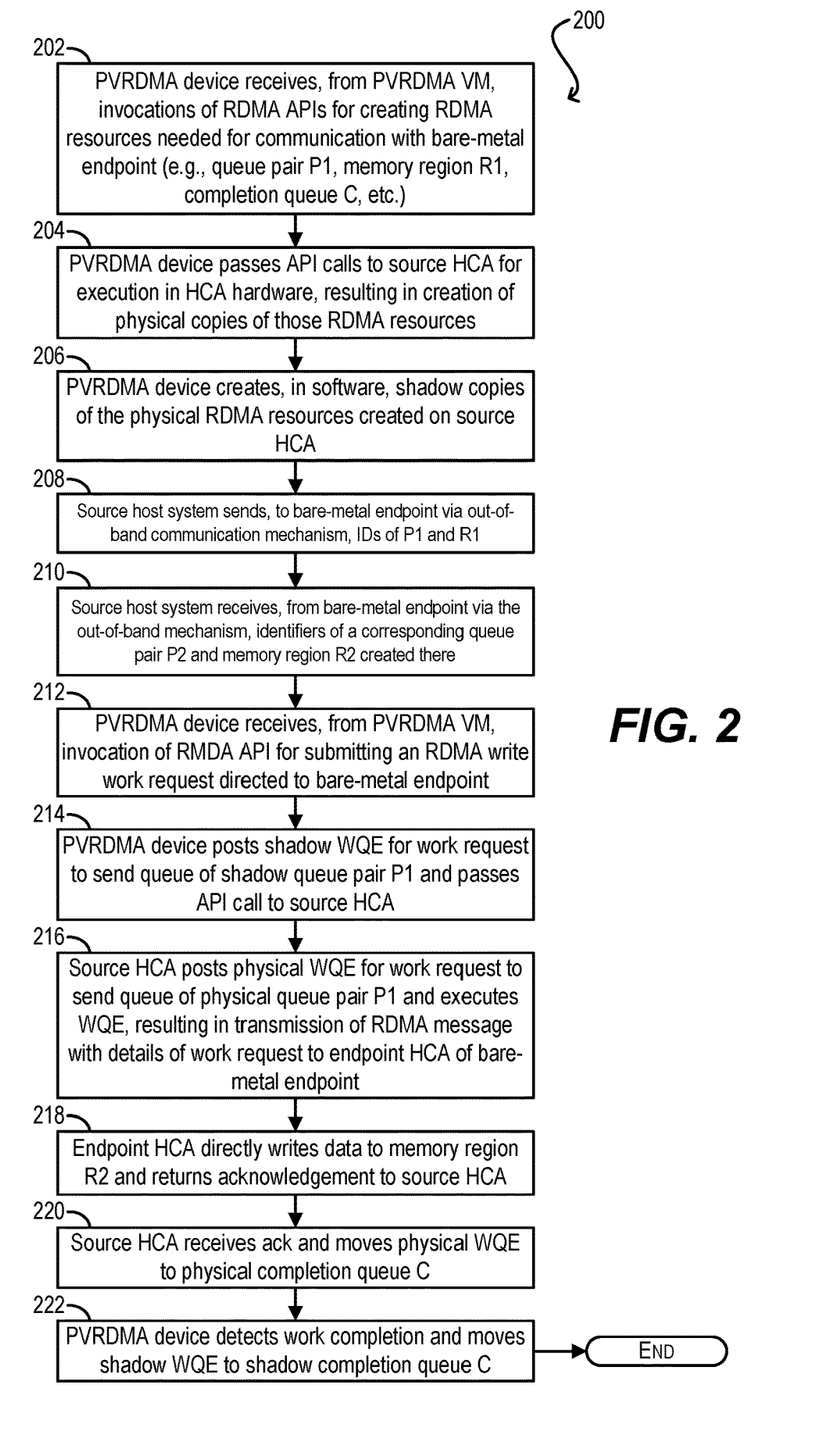
FIG. 2 depicts an example flowchart for carrying out RDMA communication between the PVRDMA VM and bare-metal endpoint of FIG. 1.

By way of example, FIG. 2 depicts a flowchart 200 of steps that may be performed by PVRDMA device 116/source HCA 118 for establishing RDMA communication with bare-metal endpoint 106/endpoint HCA 108 and for processing an RDMA write work request submitted by PVRDMA VM 114 and directed to bare-metal endpoint 106. Starting with blocks 202-206, PVRDMA device 116 receives invocations of various RDMA APIs from PVRDMA VM 114 (or more precisely, from a RDMA-aware application running in PVRDMA VM 114) for creating RDMA resources needed for communicating with bare-metal endpoint 106, passes the API calls to source HCA 118 for execution in HCA hardware (resulting in the creation of physical copies of the RDMA resources on source HCA 118), and creates, in software, shadow copies of those physical copies. In this disclosure, the phrase "shadow copy of an RDMA resource" is used interchangeably with "shadow RDMA resource," and the phrase "physical copy of an RDMA resource" is used interchangeably with "physical RDMA resource." For example, "shadow/physical copy of a queue pair" can be construed to be the same as "shadow/physical queue pair."

In various embodiments, the RDMA resources specified for creation via the API calls received at block 202 can include, e.g., a reliable-connected (RC) queue pair P1 of send and receive queues usable by source HCA 118 for posting and processing WQEs corresponding to submitted work requests, a completion queue C usable by source HCA 118 for tracking WQEs posted to queue pair P1 which have been completed, and a memory region R1 corresponding to a guest memory range of PVRDMA VM 114 that is registered for local and/or remote RDMA reading/writing. In some embodiments, the RDMA resources can also include a protection domain that associates queue pair P1 with certain other RDMA resources (such as memory region R1) and thus prevents P1 from accessing/interacting with RDMA resources outside of its protection domain.

At block 208 source host system 102 sends, to bare-metal endpoint 106 via some out-of-band communication mechanism such as a TCP (Transport Control Protocol) connection, identifiers of queue pair P1 and memory region R1 created on source HCA 118. In addition, at block 210 source host system 102 receives, from bare-metal endpoint 106 via that out-of-band communication mechanism, identifiers of a corresponding queue pair P2 and memory region R2 created on endpoint HCA 108, thereby establishing an RDMA connection to endpoint 106.

Once this RDMA connection is established, PVRDMA device 116 receives from PVRDMA VM 114 an invocation of an RDMA API for submitting an RDMA write work request directed to bare-metal endpoint 106, where the work request identifies a local memory buffer in memory region R1 that holds the write data and an offset in memory region R2 of bare-metal endpoint 106 as the target write location (block 212). In response, PVRDMA device 116 posts the work request as a WQE in the send queue of its shadow copy of queue pair P1 (referred to as a shadow WQE) and passes the API call to source HCA 118 (block 214). A WQE is a queue object that represents/encapsulates the work request and includes details such as the operation being requested via the work request (e.g., RDMA write, RDMA read, etc.) and the work request parameters (e.g., local memory buffer in R1 and target write location in R2).

At block 216, source HCA 118 receives the API call, posts the work request as a WQE in the send queue of its physical copy of queue pair P1 (referred to as a physical WQE) and executes the physical WQE, resulting in the transmission of a message (i.e., a sequence of network packets) with the write data and target write location to endpoint HCA 108 via an RDMA network protocol. The receipt of this message causes endpoint HCA 108 to directly write the write data at the specified target location within memory region R2 without intervention by endpoint 106's CPU or operating system and return a write completion acknowledgement to source HCA 118 (block 218).

At block 220, source HCA 118 receives the acknowledgement and moves the physical WQE posted at block 216 into its physical completion queue C. Finally, at block 222, PVRDMA device 116 detects the movement of the physical WQE in source HCA 118 and moves the shadow WQE posted at block 214 into its shadow completion queue C, thereby indicating to PVRDMA VM 114 that the RDMA write is now complete.

Returning now to FIG. 1, it is assumed that at some point PVRDMA VM 114 will be live migrated from source host system 102 to destination host system 104 (which includes a destination HCA 120 similar in functionality to source HCA 118), resulting in migrated versions of the VM (i.e., migrated PVRDMA VM 114') and its PVRDMA device (i.e., migrated PVRDMA device 116') at the destination side. However, as mentioned in the Background section, VM 114's use of PVRDMA complicates this live migration process. To understand why, consider the typical workflow for a live migration event. During a relatively long first phase known as the pre-copy phase, the hypervisor on the source host system copies, from the source host system to the destination host system, guest memory pages of the VM to-be-migrated while the VM is running. Because the VM is active during this phase, the source hypervisor keeps track of the guest memory pages that the VM dirties as it runs and copies these memory pages over to the destination host system in an iterative manner (i.e., over multiple pre-copy iterations). Then, during a short, second phase known as the switchover phase, the VM is temporarily stunned on the source host system, any remaining dirty guest memory pages (as well as the VM's current execution state and virtual device state(s)) are copied over, and the VM is resumed on the destination host system.

There are two main issues that PVRDMA introduces in the live migration workflow above. First, for a PVRDMA VM like VM 114 of FIG. 1, the VM is not the only entity that can write data into its guest memory; remote endpoints such as bare-metal endpoint 106 can also write data into the VM's guest memory via RDMA writes/atomic operations handled in hardware by source HCA 118. Source hypervisor 110 cannot track these incoming RDMA writes/atomic operations because the hypervisor is generally unaware that they are occurring. As a result, the guest memory pages that are dirtied by via these operations by source HCA 118 cannot be identified as dirty by source hypervisor 110 during the pre-copy phase and thus cannot be propagated to destination host system 104.

Second, as part of its operation, source HCA 118 will generate, in hardware, internal runtime state for each reliable-connected queue pair created by PVRDMA VM 114 (such as queue pair P1 discussed with respect to FIG. 2) that is distinct from the shadow RDMA resources maintained by PVRDMA device 116 and thus is not tracked by source hypervisor 110. Such internal runtime state can include, e.g., information pertaining to the current execution states of in-flight WQEs and incoming RDMA writes of the queue pair. This means that source hypervisor 110 cannot capture the complete device state of source HCA 118 (as it pertains to PVRDMA VM 114) via PVRDMA device 116 or restore it on destination host system 104 during the switchover phase.

In the scenario where all of the remote endpoints of PVRDMA VM 114 are also PVRDMA VMs, it is possible to work around the first issue by implementing a protocol in which the hypervisors of the remote endpoints notify source hypervisor 110 each time an RDMA write or atomic operation directed to a memory region of PRDMA VM 114 is issued. With this protocol, if such a notification is received during the pre-copy phase of live migrating PVRDMA VM 114, source hypervisor 110 can mark the appropriate page(s) of the targeted memory region as being dirty for transmission to destination host system 104.

Further, it is possible to work around the second issue by implementing a protocol in which (1) source hypervisor 110/PVRDMA device 116 refrains from posting any new RDMA work requests to the queue pairs of PVRDMA VM 114, and (2) the hypervisors of the remote endpoints drain (i.e., empty) the send queues of their corresponding queue pairs, once the switchover phase is started. This ensures that the physical device state of source HCA 118 with respect to PVRDMA VM 114 is made consistent with the virtual device state of PVRDMA device 116—or in other words, ensures that there is no internal runtime state on source HCA 118 pertaining to in-flight WQEs or remote RDMA operations for PVRDMA VM 114—and thus enables source hypervisor 110 to simply transfer that virtual device state to destination host system 104.

Unfortunately, if any remote endpoint of PVRDMA VM 114 is a bare-metal endpoint as in FIG. 1, these workarounds are inapplicable because bare-metal endpoints do not have a hypervisor entity that can implement these protocols. This is problematic due to the increasing importance and prevalence of bare-metal endpoints such as RDMA-capable storage arrays in virtualized computing deployments.

Figure 3:
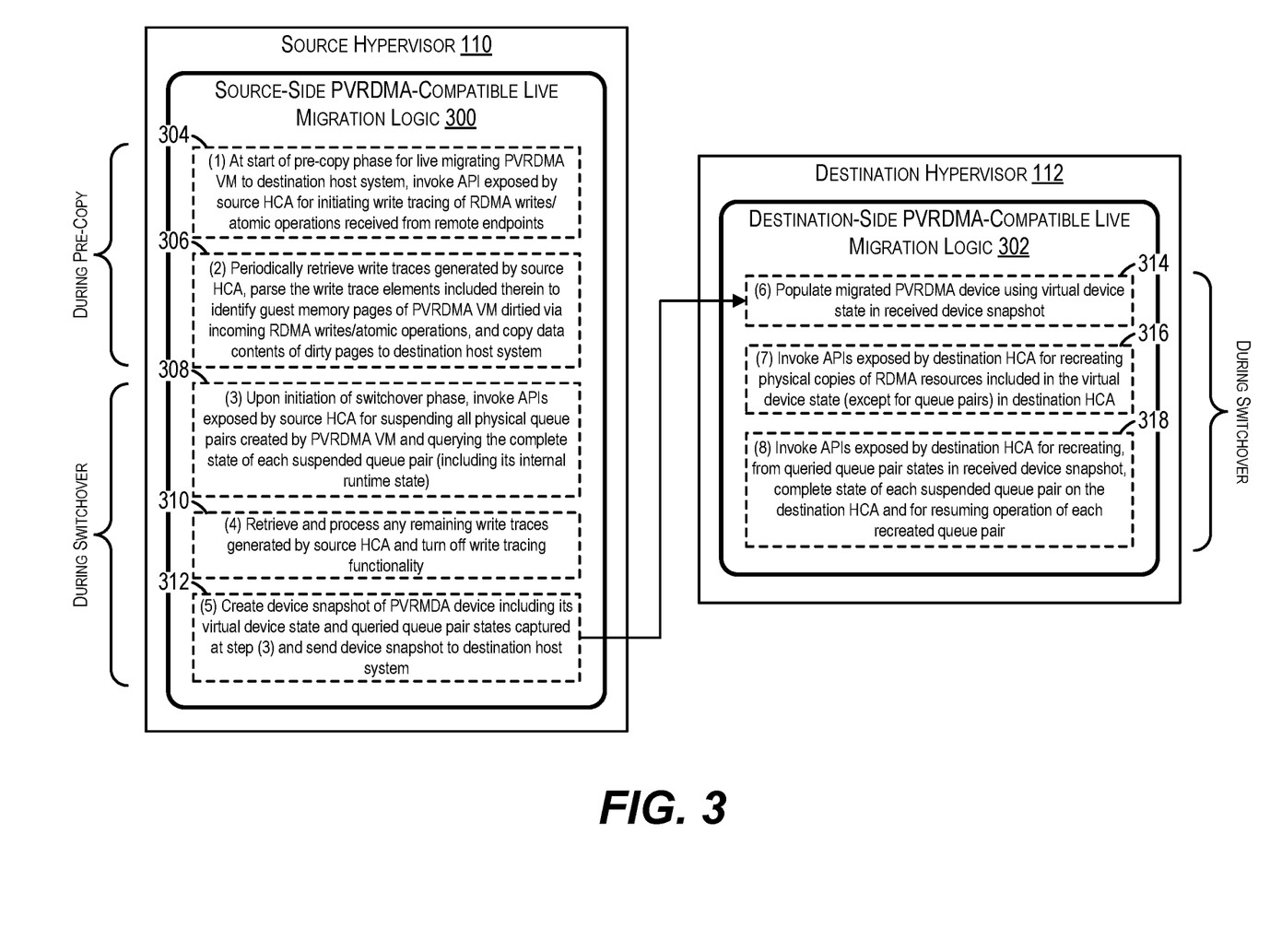
FIG. 3 depicts enhanced versions of the source and destination hypervisors of FIG. 1 and a high-level workflow that may be executed by these hypervisors for live migrating the PVRDMA VM from the source host system to the destination host system according to certain embodiments.

To address the foregoing and other similar issues, FIG. 3 depicts enhanced versions of source and destination hypervisors 110 and 112 that include novel PVRDMA-compatible live migration logic (i.e., source-side and destination-side logic 300 and 302 respectively), as well as a high-level workflow comprising steps (1)-(10)/reference numerals 304-322 that can be executed by the hypervisors in accordance with these logic components for successfully live migrating PVRDMA VM 114 from source host system 102 to destination host system 104. This high-level workflow focuses on the steps relevant for live migrating VM 114 in view of its use of PVRDMA and thus excludes conventional live migration steps applicable to all VMs. In addition, this workflow assumes the following:

1. Source HCA 118 includes hardware support for generating write traces comprising write trace elements in response to receiving and processing RDMA writes or RDMA atomic operations from remote endpoints, where the write trace element for a given RDMA write/atomic operation identifies the local memory region being written to and the specific location of the write (e.g., memory region offset and write length);
2. Source HCA 118 includes hardware support for suspending the operation of a physical queue pair on source HCA 118, such that source HCA 118 is stopped from performing any WQE processing with respect to that queue pair; in some embodiments, source HCA 118 may continue to respond to RDMA requests sent to a suspended queue pair from connected endpoints with a message (e.g., a negative acknowledgement or NACK) indicating that the requests should be retried at a later time, thereby preventing those endpoints from prematurely terminating their connections;
3. Source HCA 118 includes hardware support for querying (and thus capturing) the complete state of a suspended queue pair, including its general attributes (e.g., queue pair identifier, associated protection domain, etc.) and its internal runtime state (if it is an RC queue pair);
4. Destination HCA 120 includes hardware support for recreating the complete state of a suspended queue pair (including its internal runtime state) from a queried queue pair state;
5. Destination HCA 120 includes hardware support for resuming the operation of a suspended queue pair;
6. Source HCA 118 and destination HCA 120 include hardware support for defining and enforcing RDMA namespaces for PVRDMA VMs, such that the identifiers for all RDMA resources created within the RDMA namespace of a given VM are isolated from, and thus do not clash with, the identifiers for RDMA resources created within other RDMA namespaces; and
7. Destination HCA 120 includes hardware support for creating physical queue pairs and physical memory regions with caller-supplied identifiers.

With the foregoing assumptions in mind, at step (1) (reference numeral 304), source hypervisor 110 can invoke, at the start of the pre-copy phase for live migrating PVRDMA VM 114, an API exposed by source HCA 118 for initiating write tracing of RDMA writes/atomic operations directed to PVRDMA VM 114. This can cause source HCA 118 to generate in, e.g., a predefined memory buffer accessible by source hypervisor 110, a write trace element for each RDMA write/atomic operation that is received from a remote endpoint (such as bare-metal endpoint 106) and is targeted to a memory region associated with—or in other words, is within the RDMA namespace assigned to—PVRDMA VM 114. In certain embodiments, this write trace element can include an identifier of the target memory region and the location of the write within that memory region (e.g., memory region offset and write length).

At step (2) (reference numeral 306), during the pre-copy phase, source hypervisor 110 can periodically retrieve the write traces generated by source HCA 118, parse the write trace elements included therein to identify guest memory pages of PVRDMA VM 114 that have been dirtied via incoming RDMA writes/atomic operations, and copy the data contents of the dirty guest memory pages to destination host system 104. Source hypervisor 110 can either poll source HCA 118 to determine when new write traces are available for processing or can request to be notified of new write traces by source HCA 118.

Upon completion of the pre-copy phase and initiation of the switchover phase, source hypervisor 110 can invoke APIs exposed by source HCA 118 for suspending all physical queue pairs created by PVRDMA VM 114 and querying the complete state of each suspended queue pair, including the queue pair's internal runtime state (step (3); reference numeral 308). In addition, source hypervisor 110 can retrieve and process any remaining write traces generated by source HCA 118 and turn off the write tracing functionality (step (4); reference numeral 310). Source hypervisor 110 can then create a snapshot of PVRDMA device 116 that includes its virtual device state comprising shadow copies of the RDMA resources associated with PVRDMA device 114 and the queried queue pair states captured at step (3) and can transmit the device snapshot to destination hypervisor 112 (step (5); reference numeral 312).

Turning now to the operation of destination hypervisor 112, at step (6) (reference numeral 314), destination hypervisor 112 can populate migrated VRDMA device 116' using the virtual device state included in the device snapshot received from source hypervisor 110. In particular, destination hypervisor 112 can create shadow copies of the RDMA resources present in the virtual device state in migrated VRDMA device 116'. Further, destination hypervisor 112 can invoke APIs exposed by destination HCA 120 for recreating physical copies of those RDMA resources (except the physical queue pairs) in destination HCA 120 (step (7); reference numeral 316).

Finally, at step (8) (reference numeral 318), destination hypervisor 118 can invoke APIs exposed by destination HCA 120 for recreating, from the queried queue pair states in the received device snapshot, the complete state of each suspended queue pair on the destination HCA and resuming the operation of each recreated queue pair. The migrated PVRDMA VM (i.e., VM 114' shown in FIG. 1) can be subsequently resumed on destination host system 104 and the live migration process can end.

With this high-level workflow, a number of advantages are achieved. First, by collecting and processing the write traces generated by source HCA 118 during the pre-copy phase, source hypervisor 110 can independently track the guest memory pages of PVRDMA VM 114 that are dirtied via incoming RDMA writes/atomic operations, without any input from the hypervisors of remote endpoints. Accordingly, this functionality ensures that the complete memory state of PVRDMA VM 114 can be transferred to destination host system 104, even if the VM interacts with non-virtualized endpoints like bare-metal endpoint 106 of FIG. 1. In certain embodiments, source hypervisor 110 can employ an algorithm that guarantees that all write trace elements pertaining to a given memory region of PVRDMA VM 114 are processed before the shadow copy of that memory region within PVRDMA device 116 is deregistered/invalidated, which avoids corner cases where guest memory pages from a different memory region may be incorrectly marked as dirtied (discussed in Section (4) below).

Second, by leveraging the queue pair suspend/resume and query/recreate operations implemented by source and destination HCAs 118 and 120 during the switchover phase, source and destination hypervisors 110 and 112 can independently capture the internal runtime state of physical queue pairs present on the source side and recreate that internal runtime state on the destination side, without coordinating with the hypervisors of remote endpoints. Thus, similar to the write tracing, this functionality ensures that the complete state of PVRDMA device 116/source HCA 118 (as it pertains to PVRDMA VM 114) can be transferred to destination host system 104, even if the VM interacts with non-virtualized endpoints like bare-metal endpoint 106.

It should be appreciated that FIGS. 1-3 are illustrative and not intended to limit embodiments of the present disclosure. For example, although FIGS. 1 and 3 indicate that PVRDMA VM 114 carries out RDMA communication solely with bare-metal endpoint 106, the techniques described herein may also be used to live migrate a PVRDMA VM that communicates via RDMA with other PVRDMA VMs, in addition to or instead of bare-metal endpoints. In these embodiments, the workarounds described earlier for receiving notifications from remote endpoints regarding incoming RDMA writes/atomic operations or for bringing the VM's PVRDMA device into a consistent state with the source HCA can be eliminated, potentially resulting in faster migration.

Further, in certain embodiments source-side PVRDMA-compatible live migration logic 300 may be specifically implemented within PVRDMA device 116 of source hypervisor 110, and similarly destination-side PVRDMA-compatible live migration logic 302 may be specifically implemented within migrated PVRDMA device 116' of destination hypervisor 112.

Yet further, the various entities shown in these figures may be organized according to different arrangements/configurations or may include subcomponents or functions that are not specifically described. One of ordinary skill in the art will recognize other variations, modifications, and alternatives.

3. Queue Pair Suspend/Resume and Query/Recreate Processing

Figure 4A:
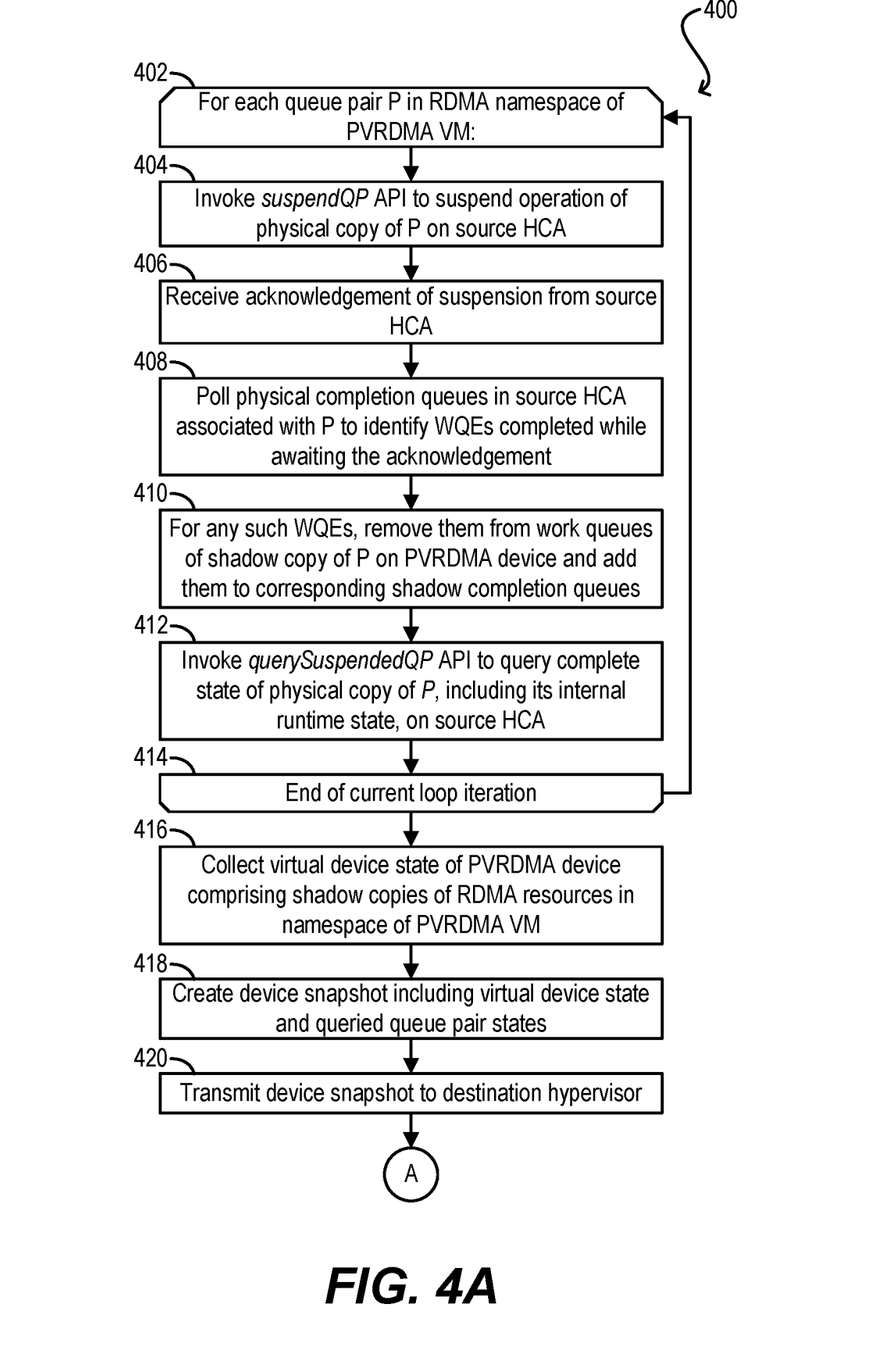
FIGS. 4A and 4B depict a flowchart with additional details regarding the switchover phase processing performed by the source and destination hypervisors in the live migration workflow of FIG. 3 according to certain embodiments.
Figure 4B:
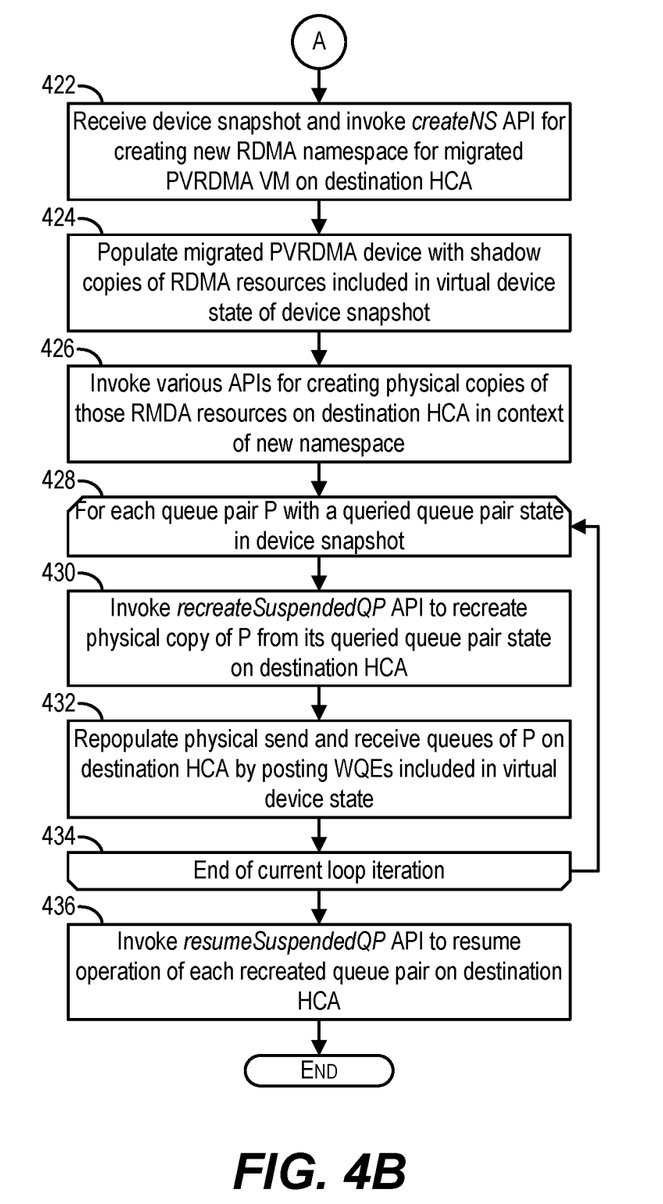

FIGS. 4A and 4B depict a flowchart 400 that provides additional details regarding the processing that may be performed by source hypervisor 110 and destination hypervisor 112 during the switchover phase of live migrating PVRDMA VM 114 (in accordance with the hypervisors' respective PVRDMA-compatible live migration logic components 300 and 302) for capturing the complete state of the VM's queue pairs on the source side and recreating the queue pairs on the destination side according to certain embodiments. The processing covered in flowchart 400 generally maps to steps (3)-(10) shown in the high-level live migration workflow of FIG. 3.

As indicated previously, flowchart 400 assumes that the source and destination HCAs implement, in hardware, operations for suspending/resuming queue pairs and querying/recreating suspended queue pairs and expose APIs to the source and destination hypervisors for executing these operations. Flowchart 400 also assumes that PVRDMA VM 114 is assigned a unique RDMA namespace on source HCA 118 in which the names/identifiers all of the VM's RDMA resources (e.g., queue pairs, memory regions, completion queues, protection domains, etc.) are contained, and destination HCA 118 allows for the named creation of physical queue pairs and memory regions.

Starting with block 402 of FIG. 4A, source hypervisor 110 can enter a loop for each queue pair P included in the RDMA namespace of PVRDMA VM 114. Within this loop, source hypervisor 110 can invoke a suspendQP (or other similarly named) API exposed by source HCA 118 to suspend the operation of the physical copy of queue pair P on the source HCA (block 404). Once this physical copy is suspended, no further changes will be made to the state of P or any of the RDMA resources in use by P (e.g., memory regions, completion queues, etc.) on source HCA 118. However, in some embodiments source HCA 118 may continue to respond to incoming RDMA requests/operations from remote endpoints that are directed to suspended queue pair P with a message (e.g., NACK) that asks the remote endpoints to retry their requests later.

At block 406, source hypervisor 110 can receive an acknowledgement of the suspension from source HCA 118. In response, source hypervisor 110 can poll the physical completion queues in source HCA 118 that are associated with P to identify any WQEs that were completed by the source HCA while source hypervisor 110 was waiting for the acknowledgement received at block 406 (block 408). For any such WQEs are found, source hypervisor 110 can remove them from the work queues of the shadow copy of P in PVRDMA device 116 and add them to the corresponding shadow completion queue(s) (block 410).

At block 412, source hypervisor 110 can invoke a querySuspendedQP (or other similarly named) API exposed by source HCA 118 to query (i.e., retrieve) the complete state of suspended queue pair P from the source HCA. This queried queue pair state can include well-known queue pair attributes such as P's identifier (also known as "queue pair number") and associated protection domain, as well as P's internal runtime state (in the case where P is an RC queue pair). In one set of embodiments, this internal runtime state can comprise:

If there is an active incoming RDMA write:
  The initial guest memory address associated with the RDMA write
  Memory region identifier (i.e., remote key) associated with the next expected RDMA write packet Length of the RDMA write First packet sequence number of currently executing WQE in the send queue of queue pair P First packet sequence number of currently executing WQE in the receive queue of queue pair P or currently incoming RDMA write operation Minimum number of WQEs in send queue that should be posted on resume Minimum number of WQEs in receive queue that should be posted on resume Latest send sequence number sent Latest message sequence number sent Number of RDB entries included in the runtime state attributes Indication of whether a communication established event has been raised Source hypervisor 110 can then reach the end of the current loop iteration (block 414) and return to the top of the loop (block 402) to process the next queue pair.

Once all of the queue pairs in the RDMA namespace of PVRDMA VM 114 have been processed, source hypervisor 110 can collect the virtual device state of the VM's PVRDMA device 116, which includes shadow copies of all of the physical RDMA resources created by PVRDMA VM 114 such as memory regions, completion queues, protection domains, and so on. (block 416). This virtual device state can also include shadow copies of the queue pairs created by PVRDMA VM 114, where each shadow queue pair includes the WQEs posted to that queue pair.

Source hypervisor 110 can subsequently create a device snapshot of PVRDMA device 116 that includes both the virtual device state collected at block 416 and the queried queue pair states captured via the loop of block 402 (block 418) and can transmit the device snapshot to destination hypervisor 112 (block 420).

Turning now to FIG. 4B, at block 422 destination hypervisor 112 can receive the device snapshot from source hypervisor 110 can invoke a createNS (or other similarly named) API exposed by destination HCA 120 for creating a new RDMA namespace for migrated PVRDMA VM 114' on destination host system 104. Destination hypervisor 112 can then populate migrated PVRDMA device 116' with all of the shadow RDMA resources included in the device snapshot (block 424) and can invoke various APIs exposed by destination HCA 120 for creating physical copies of those RDMA resources (excluding the queue pairs) on the destination HCA in the context of the newly-created namespace (block 426). As part of block 426, destination hypervisor 112 can recreate physical memory regions using a named creation API, such that the memory regions are assigned the same public identifiers (i.e., remote keys) on destination HCA 120 that they had on source HCA 118.

Destination hypervisor 112 can then enter a loop for each queue pair P that has a queried queue pair state within the device snapshot (block 428). Within this loop, destination hypervisor 112 can invoke a recreateSuspendedQP (or other similarly named) API exposed by destination HCA 120 to recreate a physical copy of queue pair P, from its queried queue pair state, in a suspended condition on the destination HCA (block 430). This will cause the recreated physical queue pair on destination HCA 120 to have the same queue pair attributes (e.g., queue pair number, protection domain, etc.) and internal runtime state that it had on source HCA 118 at the time of its original suspension on the source side.

Once the physical copy of queue pair P has been recreated in a suspended state on destination HCA 120 per block 430, destination hypervisor 110 can repopulate P's physical send and receive queues on the destination HCA by posting the required number of WQEs in each queue as specified in P's internal runtime state (block 432). These WQEs can be retrieved from the virtual device state included in the received device snapshot. Destination hypervisor 112 can then reach the end of the current loop iteration (block 434) and return to the top of the loop (block 428) to process the next queue pair.

Once all of the queue pairs have been processed, destination hypervisor 112 can invoke a resumeSuspendedQP (or other similarly named) API exposed by destination HCA 120 to resume the operation of every recreated physical queue pair on the destination HCA (block 436) and flowchart 400 can end. Although not shown, at this point migrated PVRDMA VM 114' can be resumed on destination host system 104 and the resources pertaining to original PVRDMA VM 114 on source host system 102 can be cleaned up (e.g., its RDMA resources and RDMA namespace N can be deleted). Alternatively, if the live migration fails for any reason, source hypervisor 110 can invoke the resumeSuspendedQP API on source HCA 120 for each queue pair suspended at block 404 of FIG. 4A in order to bring PVRDMA VM 114 back to an operational state on the source side.

4. Processing Write Traces in View of Memory Region Deregistration/Invalidation

As shown in FIG. 3 and discussed in Section (2) above, source hypervisor 110 can carry out a workflow during the pre-copy phase of live migrating PVRDMA VM 114 that involves collecting write traces generated by source HCA 118 in response to incoming RDMA writes/atomic operations from remote endpoints and processing the write traces to identify and transfer guest memory pages of the VM that are dirtied via those operations to destination host system 104. However, one complication with this feature is that, because each write trace element identifies a target memory region via an identifier (i.e., remote key) of that memory region, it is possible for source hypervisor 110 to inadvertently mark the wrong memory pages PVRDMA VM 114 as being dirty when concurrently processing write traces and executing operations that destroy existing memory regions via PVRDMA device 116.

In general, a memory region of PVRDMA VM 114 can be destroyed through one of two mechanisms: (1) PVRDMA device 116 receives an explicit deregistration operation from the VM, or (2) an incoming RDMA request from a remote endpoint performs an invalidation of the memory region after executing some operation on that region (e.g., a write). In either case, if source hypervisor 110/PVRDMA device 116 destroys the virtual copy of the memory region before its physical copy is destroyed on source HCA 118, the memory region's remote key may be reused for a newly registered memory region before write trace elements pertaining to the original memory region are processed. This in turn, can cause source hypervisor 110 to mark portions of the new (rather than the original) memory region as being dirty per the write trace elements, which is incorrect.

Figure 5:
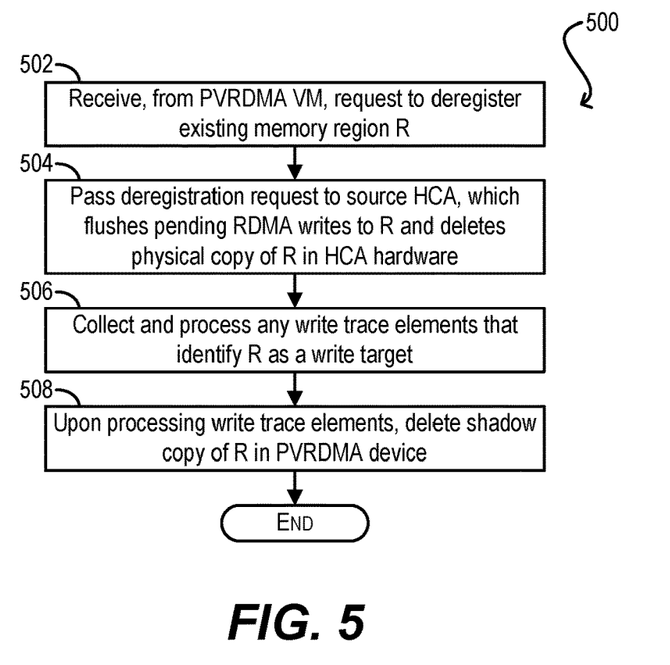
FIGS. 5 and 6 depicts flowcharts for processing RDMA write traces in view of memory region deregistration/invalidation operations according to certain embodiments.
Figure 6:
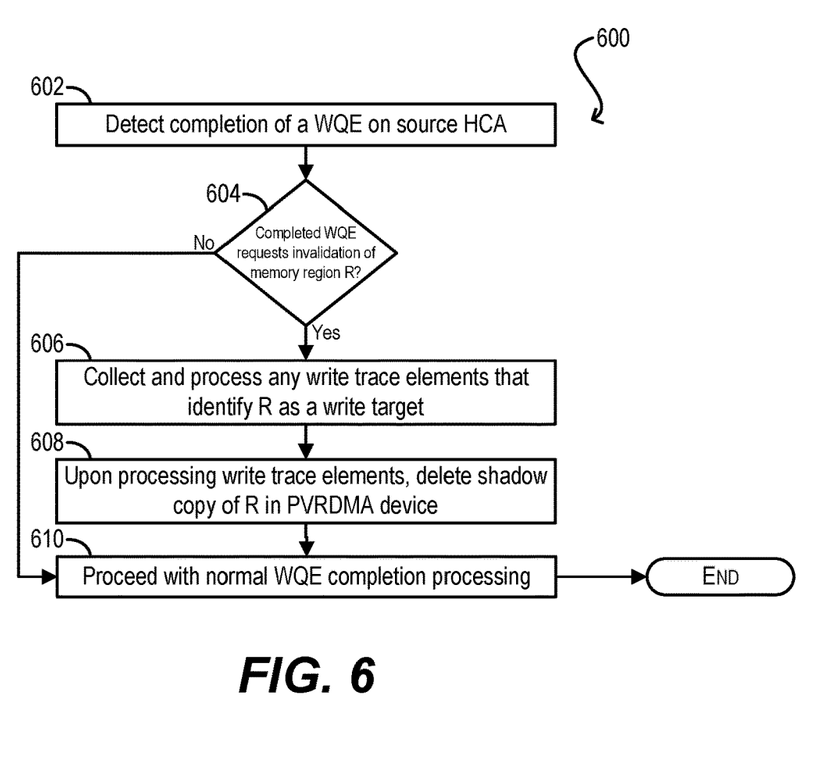

To address this, FIG. 5 depicts a flowchart 500 that can be executed by source hypervisor 110 at the time of receiving a request for deregistering a memory region R from PVRDMA VM 114, and FIG. 6 depicts a flowchart 500 that can be executed by source hypervisor 110 at the time of processing a work completion (i.e., movement of a WQE from a work queue to a completion queue) generated by source HCA 118 that requests invalidation of a memory region R. In both of these flowcharts, source hypervisor 110 ensures any write trace elements pertaining to memory region R are processed before the virtual copy of R in PVRDMA device 116 is deleted (and thus, before the remote key of R can be reused by a new memory region), thereby preventing incorrect memory pages from being marked as dirty and transferred to destination host system 104 during the pre-copy phase.

Starting with block 502 of FIG. 5, source hypervisor 110 can receive, from PVRDMA VM 114, a request to deregister an existing memory region R of the VM. In response, source hypervisor 110 can pass the deregistration request to source HCA 118, which can flush any pending RDMA writes directed to memory region R and can delete the physical copy of R in HCA hardware (block 504).

Once the physical copy of memory region R is deleted, source hypervisor 110 can collect and process any write trace elements generated by source HCA 118 that identify R as a write target, which means the source hypervisor can mark the memory pages of R dirtied per those write trace elements and send them to destination host system 104 (block 506). Finally, source hypervisor 110 can delete the shadow copy of memory region R maintained by PVRDMA device 116 (block 508).

Turning now to FIG. 6, source hypervisor 110 can detect the completion of a WQE in source HCA 118 (block 602) and can check whether the completed WQE requests invalidation of a memory region R of PVRDMA VM 114 (block 604). If the answer is yes, source hypervisor 110 can collect and process any write trace elements generated by source HCA 118 that identify memory region R as a write target (block 606) and then delete the shadow copy of R maintained by PVRDMA device 116 (block 608). Finally, at block 610, source hypervisor 110 can proceed with its normal processing of the completed WQE and the flowchart can end.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a generic computer system comprising one or more general purpose processors (e.g., Intel or AMD x86 processors) selectively activated or configured by program code stored in the computer system. In particular, various generic computer systems may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any storage device, based on any existing or subsequently developed technology, that can store data and/or computer programs in a non-transitory state for access by a computer system. Examples of non-transitory computer readable media include a hard drive, network attached storage (NAS), read-only memory, random-access memory, flash-based nonvolatile memory (e.g., a flash memory card or a solid state disk), persistent memory, NVMe device, a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while certain virtualization methods referenced herein have generally assumed that virtual machines present interfaces consistent with a particular hardware system, persons of ordinary skill in the art will recognize that the methods referenced can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the present disclosure. In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments and are presented to illustrate the flexibility and advantages of particular embodiments as defined by the following claims. Other arrangements, embodiments, implementations, and equivalents can be employed without departing from the scope hereof as defined by the claims.

What is claimed is:

1. A method comprising, during a pre-copy phase of live migrating a paravirtual remote direct memory access (PVRDM) virtual machine (VM) from a source host system to a destination host system:

invoking, by a source hypervisor of the source host system, a first application programming interface (API) exposed by a source host channel adapter (HCA) of the source host system for initiating write tracing of remote direct memory access (RDMA) writes or atomic operations comprising writes received from remote endpoints;

retrieving, by the source hypervisor, a write trace generated by the source HCA in response to the invoking, the write trace including a write trace element identifying a memory region of the PVRDMA VM written to as a result of an RDMA write or atomic operation and a write location within the memory region; and processing, by the source hypervisor, the write trace element by:
 identifying, based on the write trace element, one or more dirty guest memory pages of the PVRDMA VM; and
 transmitting data contents of the one or more dirty guest memory pages to a destination hypervisor of the destination host system.

2. The method of claim 1 further comprising, during a switchover phase of the live migrating of the PVRDMA VM:
 retrieving and processing any remaining write trace elements not previously processed during the pre-copy phase; and
 invoking a second API exposed by the source HCA for disabling the write tracing.

3. The method of claim 1 wherein prior to processing the write trace element, the source hypervisor receives, from the PVRDMA VM, a request to deregister the memory region.

4. The method of claim 3 wherein the source hypervisor ensures that it processes the write trace element before deleting a shadow copy of the memory region in response the request.

5. The method of claim 1 wherein prior to processing the write trace element, the source hypervisor detects completion of a work request element on the source HCA that requests invalidation of the memory region.

6. The method of claim 5 wherein the source hypervisor ensures that it processes the write trace element before deleting a shadow copy of the memory region in response to the detecting.

7. The method of claim 1 wherein the remote endpoints include at least one bare-metal RDMA endpoint.

8. A non-transitory computer readable storage medium having stored thereon program code executable by a source hypervisor of a source host system, the program code embodying a method comprising, during a pre-copy phase of live migrating a paravirtual remote direct memory access (PVRDM) virtual machine (VM) from the source host system to a destination host system:
 invoking, by the source hypervisor, a first application programming interface (API) exposed by a source host channel adapter (HCA) of the source host system for initiating write tracing of remote direct memory access (RDMA) writes or atomic operations comprising writes received from remote endpoints;
 retrieving, by the source hypervisor, a write trace generated by the source HCA in response to the invoking, the write trace including a write trace element identifying a memory region of the PVRDMA VM written to as a result of an RDMA write or atomic operation and a write location within the memory region; and
 processing, by the source hypervisor, the write trace element by:
  identifying, based on the write trace element, one or more dirty guest memory pages of the PVRDMA VM; and
  transmitting data contents of the one or more dirty guest memory pages to a destination hypervisor of the destination host system.

9. The non-transitory computer readable storage medium of claim 8 wherein the method further comprises, during a switchover phase of the live migrating of the PVRDMA VM:
 retrieving and processing any remaining write trace elements not previously processed during the pre-copy phase; and
 invoking a second API exposed by the source HCA for disabling the write tracing.

10. The non-transitory computer readable storage medium of claim 8 wherein prior to processing the write trace element, the source hypervisor receives, from the PVRDMA VM, a request to deregister the memory region.

11. The non-transitory computer readable storage medium of claim 10 wherein the source hypervisor ensures that it processes the write trace element before deleting a shadow copy of the memory region in response the request.

12. The non-transitory computer readable storage medium of claim 8 wherein prior to processing the write trace element, the source hypervisor detects completion of a work request element on the source HCA that requests invalidation of the memory region.

13. The non-transitory computer readable storage medium of claim 12 wherein the source hypervisor ensures that it processes the write trace element before deleting a shadow copy of the memory region in response to the detecting.

14. The non-transitory computer readable storage medium of claim 8 wherein the remote endpoints include at least one bare-metal RDMA endpoint.

15. A host system comprising:
 a hypervisor including a paravirtual remote direct memory access (PVRDMA) device;
 a host channel adapter (HCA);
 a PVRDMA virtual machine (VM) using the PVRDMA device for remote direct memory access (RDMA) communication; and
 a non-transitory computer readable medium having stored thereon program code that causes the hypervisor to, during a pre-copy phase of live migrating the PVRDMA VM to a destination host system:
  invoke a first application programming interface (API) exposed by the HCA for initiating write tracing of RDMA writes or atomic operations comprising writes received from remote endpoints;
  retrieve a write trace generated by the HCA in response to the invoking, the write trace including a write trace element identifying a memory region of the PVRDMA VM written to as a result of an RDMA write or atomic operation and a write location within the memory region; and
  process the write trace element by:
   identifying, based on the write trace element, one or more dirty guest memory pages of the PVRDMA VM; and
   transmitting data contents of the one or more dirty guest memory pages to a destination hypervisor of the destination host system.

16. The host system of claim 15 wherein the program code further causes the hypervisor to, during a switchover phase of the live migrating of the PVRDMA VM:
 retrieve and process any remaining write trace elements not previously processed during the pre-copy phase; and invoke a second API exposed by the HCA for disabling the write tracing.

17. The host system of claim 15 wherein prior to processing the write trace element, the hypervisor receives, from the PVRDMA VM, a request to deregister the memory region.

18. The host system of claim 17 wherein the hypervisor ensures that it processes the write trace element before deleting a shadow copy of the memory region in response the request.

19. The host system of claim 15 wherein prior to processing the write trace element, the hypervisor detects completion of a work request element on the HCA that requests invalidation of the memory region.

20. The host system of claim 19 wherein the hypervisor ensures that it processes the write trace element before deleting a shadow copy of the memory region in response to the detecting.

21. The host system of claim 15 wherein the remote endpoints include at least one bare-metal RDMA endpoint.

* * * * *